T. J. Hall,

Gang Plow.

No. 3,750.

Reissued Nov. 30. 1869.

Witnesses.

R. H. Whitney

Isaac D. Sailer.

Inventor.

Thos. J. Hall

By N. Crawford atty.

N. PETERS, PHOTO-LITHOGRAPHER, WASHINGTON, D.C.

United States Patent Office.

THOMAS J. HALL, OF BRYAN, TEXAS.

*Letters Patent No.* 89,144, *dated April* 20, 1869; *reissue No.* 3,750, *dated November* 30, 1869.

IMPROVEMENT IN GANG-PLOWS.

The Schedule referred to in these Letters Patent and making part of the same.

*To whom it may concern:*

Be it known that I, THOMAS J. HALL, of Bryan, in the county of Brazos, in the State of Texas, did invent certain new and useful Improvements in Gang-Plows, and obtained Letters Patent therefor, which patent is dated April 20, 1869; and that I, the said THOMAS J. HALL aforesaid, am the sole owner of the entire patent; and I hereby declare that the following amended specification is a full and exact description of the invention, reference being had to the accompanying drawings, and to the letters of reference marked thereon, in which—

Figure 1:
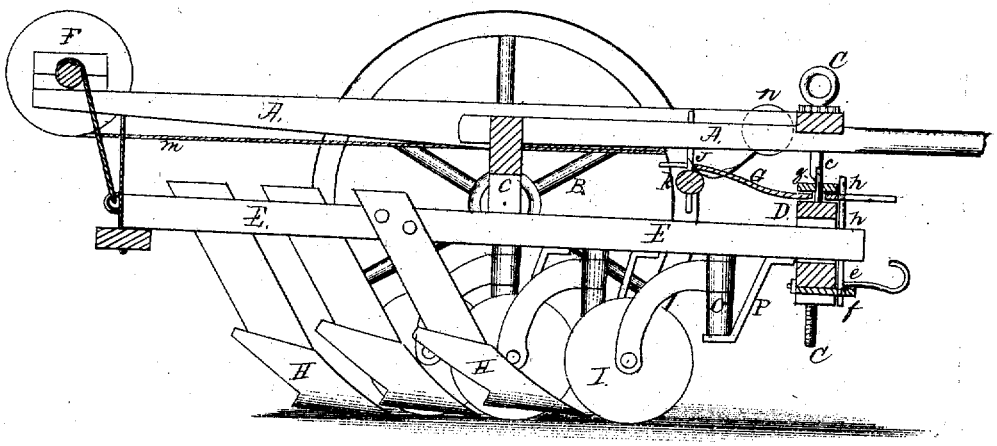

Figure 1 represents a side elevation, partly in section, of my improved gang-plow.

Figure 2:
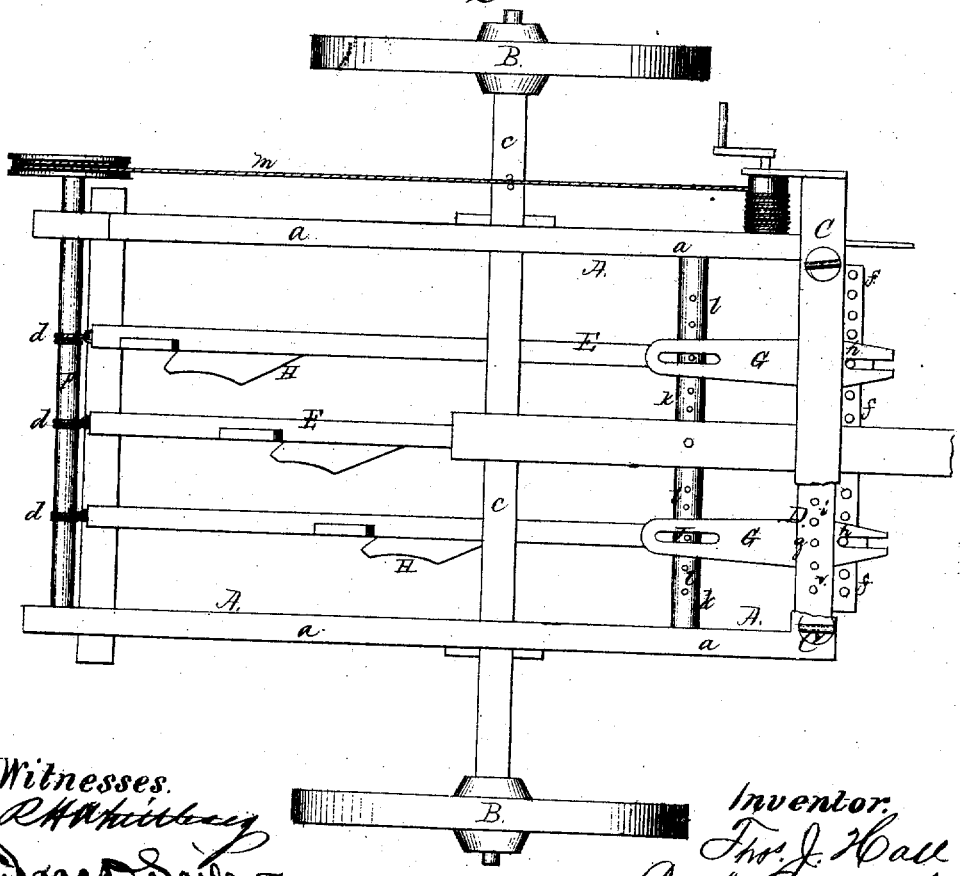

Figure 2, a plan or top view of the same.

Similar letters of reference indicate corresponding parts.

This invention relates to a gang-plow, which is so arranged that the beams can be adjusted sideways and up and down, at will, and can be permanently secured in any desired position in either movement.

The invention consists—

First, in a new device for oscillating the plow-beams, so that their landsides are always vertical, however uneven the ground may be;

Secondly, in a new apparatus for regulating the depth at which the plows may work in the ground, and whereby the depth of the furrow is regulated; and Thirdly, in a new means of sustaining and strengthening the shaft or stock of the revolving cutter or coulter.

A, in the drawing, represents the frame of the gang-plow, which is made of wood, and consists of two side-bars, *a a*, of a front cross-bar, *b*, and a fixed, or revolving, or other suitable axle, *c*, for the wheels B, and of other suitable braces, if desired.

From the front bar *b* is, by reason of vertical screws C C, suspended an up-and-down adjustable cross-bar, D, which is slotted to receive the front ends of the plow-beams E.

The three, or more or less plow-beams are, with their rear ends, suspended by means of cords or chains *d d*, from a transverse shaft, F, which has its bearings in the rear part of frame A, as shown.

Their front ends are fitted through the adjustable bar D, and have downward-projecting pins *e e*, that fit into a perforated plate, *f*, fastened to the lower part of the bar D.

The pins *e* can swing laterally in the plate *f*, and thereby allow the plow-beams to oscillate. They also allow them to be adjusted at any desired distance apart, by being put into the requisite holes of the plate *f*.

To cross-bar D are, by means of pins *g g*, pivoted levers G G, that have forked front ends fitting around pins *h h*, that project from the front ends of the plow-beams.

By swinging the levers G, the plow-beams will be oscillated on the pins *e*, as aforesaid, so as to bring the plows into the desired position to have their landsides vertical.

The pins *g g* are also adjustable on the bar D, there being holes *i i* provided to receive them.

The rear ends of the levers G can, when the plows have been brought into the right position, be locked by means of the pins *j j*, fitted into a cross-bar, *k*, of the frame A, as shown, a number of holes, *l*, being provided in bar *k*, to allow of the lateral adjustment of the plows.

The rear ends of the plow-beams can be elevated or lowered, by revolving the shaft F, in which case the strings *d d* will be wound on, or unwound from the said shaft.

The shaft can be revolved either directly, by having a crank on it, or by connecting it, by means of a belt or cord, *m*, with drum *n*, arranged within convenient reach of the driver for turning.

The plows H H are arranged in suitable manner on the plow-beams, and are of suitable construction.

In front of each plow is a revolving cutter or coulter, I, the stock or shaft O of which is swivelled into or by any other proper means attached to the plow-beams, so that it can freely turn in the beam or other fastening, as is shown in patents granted to me, April 3, 1855, and May 1, 1855; but instead of leaving the stock or shaft O of the coulter, as is shown in that patent, I cut off the forked or lower end of the stock or shaft O, and make a pivot or turning-pin, *p*, on its bottom or lower end, which fits into and freely turns in a hole or bearing in the lower end of the brace or bridle P.

This brace or bridle P is firmly bolted or fastened to the plow-beam E, and sufficiently strong, when bent downward and receiving the lower end of the stock or shaft O, to hold the said shaft O in its proper position, and thereby relieve the shaft from the strain that is thrown upon it at its bearing on the under side of the plow-beam, preventing wear and constant danger of breaking or bending at that point, and relieving it of nearly all friction in the bearing, whether placed in, or that which may be attached to the plow-beam.

By this improved means of supporting and holding the stock O in its position, the revolving coulter will revolve on its axis, and turn to follow the line of draught with less friction, and requires less motive-power to propel the plow or gang of plows.

Having thus fully described my invention,

What I desire to secure by Letters Patent, is—

1. The combination of the up-and-down adjustable slotted cross-bar D, having the perforated plate *f*, with the plow-beams E, pins *e*, and pivoted levers G, all arranged and operating substantially as and for the purpose herein shown and described.

2. The levers G, pivoted to the up-and-down adjustable cross-bar D, connected at their front ends with the plow-beams, and adjusted with their rear ends on a cross-bar, *k*, all arranged and operating substantially as described, for the purpose of oscillating the plow-beams, as specified.

3. The brace or bridle P, when constructed and arranged, with relationto the plow-beam and revolving cutter I, to support and strengthen the stock O, in the manner substantially as described.

Witnesses: THOS. J. HALL.

H. P. STOCKTON,

JOHN F. FENNELL.